Feb. 21, 1967  G. J. KARDOL  3,304,792
CHAIN GEARING

Filed June 16, 1964

Inventor
Gerard J. Kardol
By Cushman, Darby & Cushman
Attorneys

Feb. 21, 1967  G. J. KARDOL  3,304,792
CHAIN GEARING

Filed June 16, 1964 2 Sheets-Sheet 2

Inventor
Gerard J. Kardol
By Cushman, Darby & Cushman
Attorneys

United States Patent Office 3,304,792
Patented Feb. 21, 1967

3,304,792
CHAIN GEARING
Gerard J. Kardol, Geleen, Netherlands, assignor to Stamicarbon N.V., Heerlen, Netherlands
Filed June 16, 1964, Ser. No. 375,481
Claims priority, application Netherlands, June 19, 1963, 294,269
1 Claim. (Cl. 74—219)

This invention relates to toothed chain wheels for use with open-link chains of the kind normally of oval link type wherein the links are freely connected by interlooping of the adjacent links.

In the past, chain-engaging wheels of the type where each lying link occupies a recess in the periphery of the wheel between two teeth have been so designed that one-half the pitch of the wheel is at least equal to the largest chain pitch which occurs during operation. In an arrangement of this kind, one-half the pitch of the wheel may be defined as the circumference of the pitch circle divided by twice the total number of teeth, and the pitch of the chain may be defined as the nominal largest inner dimension of a link. The chain pitch may also be defined as one-half the distance between corresponding points of two succeeding lying links and as the length of the chain divided by the number of links. During operation of these conventional wheel and chain arrangements, the last tooth to engage the chain carries the load. When this power-transmitting link disengages from this load-carrying tooth, in an arrangement where one-half the wheel pitch exceeds the chain pitch, the chain slips a small amount on the wheel in a direction opposite to the direction of rotation of the wheel, until the next tooth takes up the load. This slippage results in a jerky movement of the chain if the latter is being driven by the wheel, or a jerky rotation of the wheel if the chain is the driving element. In addition, both the chain and the wheel are subject to considerable wear because the load-bearing links move along the flanks of the teeth and the bottoms of the recesses with high friction, particularly at the point of disengagement of the last tooth from the wheel.

The aforementioned slippage of the chain on the wheel is a necessary feature of conventional constructions as otherwise an incoming lying link will, after a time, come to rest against the trailing side of a tooth. Each following link will touch the flank at a higher point, so that subsequent links will soon come to rest on the tops of the teeth with the result that the wheel will completely slip under the chain. However, under some conditions of operation, slippage between chain and wheel at each tooth disengagement does not occur. In a chain driving a return wheel, for example, the ratio between the forces in both parts is almost equal to unity, so that there is no tendency of the chain to slip.

It is the primary object of this invention to reduce the jerky operation and frictional wear on the teeth and chain which occur with conventional arrangements where the chain slips relative to the wheel and where disengagement of drive tooth and chain link occurs when the tooth is under load.

It is a further object to provide a chain wheel of the type which engages alternate links of a chain in recesses between teeth, which is constructed with a one-half wheel pitch which is smaller, by an amount up to 3% smaller, than the nominal largest inner dimension of a link of the chain whereby frictional wear of the chain and wheel is reduced and whereby smoother operation is attained.

In the arrangement constructed according to the invention, one-half the pitch of the wheel is shortened in order to obtain a tooth-link interaction which is related to the shortest chain pitch occurring during operation rather than to the longest chain pitch as in conventional systems. In operation of the new arrangement the first and second links to engage the wheel take the main load with an incoming link coming to rest against the flank of a tooth. This latter feature does not, however, present any difficulties. At full load the chain does not move along the tooth flanks, and there is no slippage between the chain and the wheel as a whole. There is slippage of the lying link toward the bottom of its recess only after the load has been taken up by subsequent links, and this action permits the slippage which is required for proper alignment of later links with the wheel. Accordingly, there is less wear because the slippage occurs between the non-loaded elements of the system.

The invention will be further understood from the following detailed discussion taken in conjunction with the drawing in which.

Figure 1:
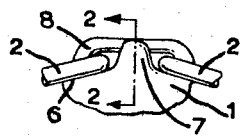
FIGURE 1 is a fragmentary side elevational view of a wheel and chain assembly constructed in accordance with the principles of the present invention.
Figure 2:
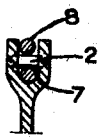
FIGURE 2 is a fragmentary sectional view taken on the line 2—2 of FIGURE 1.

Referring to FIGURES 1 and 2 there is shown a chain wheel 1 having a plurality of circumferential teeth 7 which are spaced apart by recesses 6 which receive the lying links 2 of a chain. Each of the teeth are of bifurcated configuration with the two parts defining a space for receiving the upright links 8 of the chain. As will be described in detail later one-half the pitch of the wheel, according to the invention, is made smaller than in conventional construction of the same general type.

Figure 3:
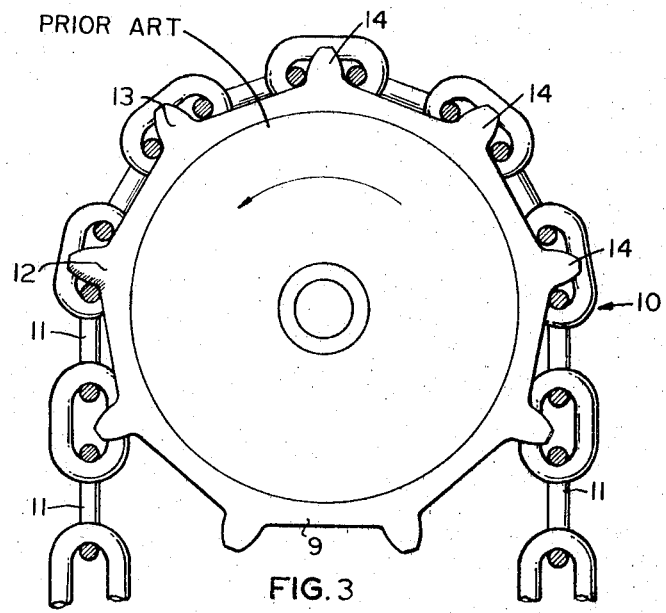
FIGURE 3 is a side elevational view, partly in section and with the upright links removed, illustrating the operation of a conventional wheel and chain assembly of the general type under consideration.

Referring to FIGURE 3 there is shown in detail a wheel 9 and driven chain 10 constructed generally like that of FIGURES 1 and 2 except that the chain pitch, as is conventional, is slightly shorter than the wheel pitch. In this figure the lying links 11 are shown as if cut away along a vertical plane passing through their major axes. In this arrangement the wheel 9 is so designed that the smallest links when engaging the teeth on the right as viewed in the figure, can just turn inwards along the trailing flanks of the teeth. In the position shown, the tooth 12, on the left, takes the load and the other teeth 13, 14 are unloaded. When the wheel 9 rotates counterclockwise, the link engaging the loaded tooth 12 moves outwardly along the leading flank thereof at full load. The chain 10 then becomes clear of the teeth for a moment and slips to the right, against the direction of rotation until the tooth 13 takes up the load. If this slip should not take place, a lying link 11 would come to rest on the top of a tooth after a given angular displacement of the wheel, as has already been described. In practice the pitch of the chain 10 and that of the chain wheel 9 are never perfectly equal. Reduction of the manufacturing tolerance is not justified economically and is difficult to attain technically; in addition, elongation and wear are not uniform in practice, so that a still higher precision would be of little value.

In the conventional arrangement as illustrated in FIGURE 3 the teeth 12, 13, 14 are made rather slender to ensure that the smallest chain pitch also fits in on the wheel. In the case where the chain 10 drives the wheel 9, when the slipping back of the chain 10 is not caused by the ratio of forces in both parts of the chain, the flanks are so shaped that this shortest chain is just caught by these flanks. To this end the flanks must have a stronger curvature than would correspond to the natural curvature of the incoming links. This shape of the flanks is unfavorable, as the links are more easily drawn into the recesses when the teeth have steeper flanks. Often a high preload is applied to the chain to ensure proper co-operation, and the result of this is a still heavier wear.

Figure 4:
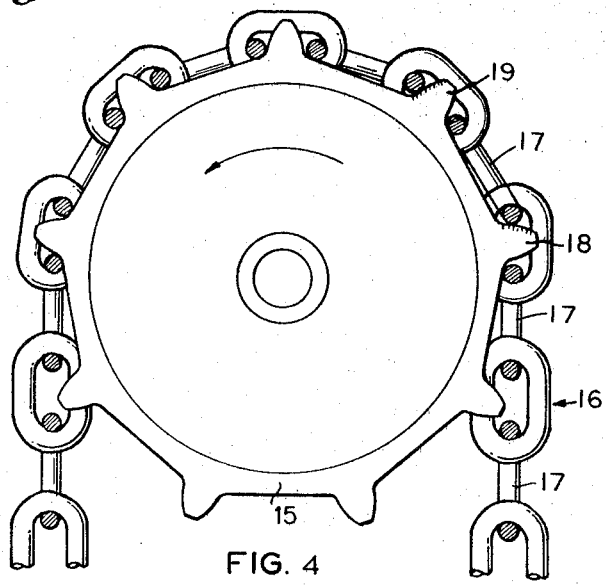
FIGURE 4 is a view, analogous to FIGURE 3, illustrating the operation of the wheel and chain assembly of the present invention.

Referring now to FIGURE 4, which illustrates the principles of the present invention, there is shown a wheel 15 and a driven chain 16 which mesh in an essentially different way. The chain link with the smallest pitch keeps clear of the trailing flanks of the teeth, since the dimensions of the wheel have been derived from this pitch. The position of the chain 16 is essentially the same for both types of drive, i.e., when the chain 16 drives the wheel 15 and vice versa. The incoming lying link 17 touches the leading flank of a tooth 18 which then takes over the main load from the preceding tooth 19. This is effected gradually as the wheel 15 rotates further. The links do not slip as long as they co-operate with teeth 18 and 19 that transmit the load, and as a result, the amount of wear is very small and the movement is very smooth. The flanks are as steep as possible, i.e. they have the exact shape that is required by the incoming and outgoing links with the smallest pitch. A high preload is, therefore, not necessary and is even undesirable.

Apart from the first and the second link, that is those engaging teeth 18 and 19, the links on the wheel are unloaded, and are sure to nest on the bottoms of the recesses. After a link has released the load, there is a small and gradual displacement in the direction of rotation without the attendance of large sliding forces.

The arrangement according to the invention makes use of the shortening of the chain pitch which occurs during operation. This pitch shortening occurs because the lying links, when running onto the wheel 15 tend to roll along the loops of the upright links (not shown in FIGURE 4). This results in an outward movement of the point of contact between adjacent links, and this movement shortens the pitch of the chain as compared with a chain which hinges without friction. True rolling occurs only during the initial stage of hinging, after which the links slide along each other. However, in the final position, there remains a shortening of the pitch, which depends on the coefficient of friction between adjacent links.

Figure 5:
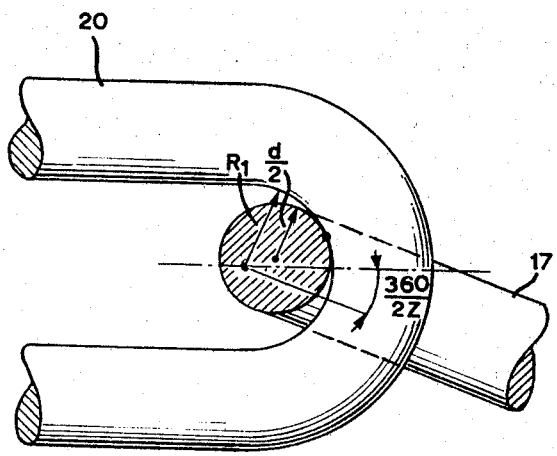
FIGURE 5 is a fragmentary view showing the relationship between adjacent chain links when the links are on a wheel.

FIGURE 5 illustrates the hinging of adjacent links which results in the above-described shortening of the chain pitch. In the figure $R_1$, is the internal radius of the loop of an upright link 20, $d$ is the diameter of the bar which forms the lying link 17 and $Z$ is the number of recesses on the wheel. For the upright link 20 the amount of pitch shortening may be expressed as $2R_1(1-\cos \varphi)$, and for the lying link 17 the amount of pitch shortening may be expressed as $$2\left(R_1-\frac{d}{2}\right)\left\{1-\cos\left(\frac{360}{2Z}+\varphi\right)\right\}$$

where $\varphi$ is dependent on the coefficient of friction between the links 17 and 20. It may be shown by calculation that for a wheel having 9 recesses, where $R$, is 13 mm., $d$ is 22 mm., coefficient of friction is 0.35, the shortening of the pitch of an upright link is 1.47 mm. and the shortening of the pitch of a lying link is 0.91 mm. At a nominal chain pitch of 86 mm. these pitch reductions amount to 1.71% and 1.06%, respectively.

In cases where the nominal pitch has the above value of 86 mm. the calculation of the pitch diameter of the wheel has previously been based on the largest pitch, which may be, e.g. 78 mm. In the arrangement according to the invention the calculation is based on the shortest pitch, e.g. 85 mm. dependent on the attendant friction coefficient, so that the tolerance and the shortening of the pitch have been taken into account.

Thus the wheel of the present invention is constructed to cooperate in a special way with the shortest possible pitch of the chain, account being taken of the shortening of the chain pitch that occurs during operation owing to friction between links. In addition, the wheel is rendered suitable for chains with a larger pitch by making the flanks of the teeth as steep as possible. Thus, the range of suitable pitches can be very considerably extended upwards, and this is an advantage as chains can only become longer during operation. A wheel now always co-operates with a chain that is relatively too long for this wheel, i.e. the chain pitch is greater than one-half the pitch of the wheel. A lying link which enters into engagement touches the flank of a tooth at a point which corresponds to the chain pitch. When the engaged part of the wheel rotates further, the link will slip down towards the bottom of the recess when the load has been taken over by a following tooth. If any pull is exerted on the outgoing end of the chain, the link may be drawn against the base of the trailing side of a tooth immediately before disengagement. Consequently, the link slips along the bottom of the recess in the direction of rotation during the last stage.

It is theoretically possible for a conventional wheel and chain arrangement, after much wear and stretch, to attain the above-described co-operation between the elements. As a practical matter, however, the chain and/or wheel will become so warn that the assembly will have been discarded or repaired long before the desired co-operation is attained.

Thus, it will be appreciated that the present invention is an important step forward in increasing the life of a wheel and chain assembly. The invention is of particular advantage when the chain is subject to large tensile forces. An instance of the application is the drive of a coal-gathering machine in a mine, where a pull on the chain of 15–30 tons is not unusual. It has been found that under such conditions the present invention considerably lengthens the life of the wheels and chains and drastically reduces the number of break-downs.

While a specific example of the invention has been described in order to illustrate the invention modifications thereof are possible within the scope of the invention, and it is not intended that the described details be limiting except as they appear in the appended claim.

What is claimed is:

A toothed wheel and open-link, looped chain assembly wherein alternate loops of the chain engage recesses on the periphery of the wheel between adjacent teeth, said wheel having a one-half pitch which is smaller, by an amount up to 3% smaller, than the nominal largest inner dimension of a link of the chain, said one-half wheel pitch being defined as the circumference of the pitch circle divided by 2 times the number of teeth, whereby frictional wear of the chain and wheel is reduced and whereby intermittent operation caused by slippage between wheel and chain is reduced.

(References on following page)

References Cited by the Examiner

UNITED STATES PATENTS

| | | | |
|---|---|---|---|
| 528,847 | 11/1894 | Briggs | 74—243 |
| 592,552 | 10/1897 | Morse | 74—250 |
| 595,937 | 12/1897 | Bufford | 74—250 |
| 2,199,688 | 5/1940 | Boldt | 74—243 |
| 2,259,937 | 10/1941 | Klaucke | 74—243 |
| 2,321,702 | 6/1943 | Renkin | 74—243 |
| 2,349,578 | 5/1944 | Ellen | 74—243 X |
| 2,757,784 | 8/1956 | Stroh et al. | 74—243 X |

FOREIGN PATENTS

| | | |
|---|---|---|
| 829,691 | 1/1952 | Germany. |
| 648,940 | 1/1951 | Great Britain. |
| 833,365 | 4/1960 | Great Britain. |

DAVID J. WILLIAMOWSKY, *Primary Examiner.*

J. A. WONG, *Assistant Examiner.*